(12) United States Patent
Chan et al.

(10) Patent No.: US 11,030,610 B2
(45) Date of Patent: Jun. 8, 2021

(54) PREAUTHORIZATION OF MOBILE PAYMENTS EXPECTED IN A REDUCED-FUNCTIONALITY STATE

(71) Applicant: INTERNATIONAL BUSINESS MACHINES CORPORATION, Armonk, NY (US)

(72) Inventors: Yuk L. Chan, Rochester, NY (US); Al Chakra, Apex, NC (US); Jian Jun Wang, Xi'An (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 143 days.

(21) Appl. No.: 16/149,177

(22) Filed: Oct. 2, 2018

(65) Prior Publication Data

US 2020/0104823 A1  Apr. 2, 2020

(51) Int. Cl.
| | |
|---|---|
| *G06Q 20/32* | (2012.01) |
| *G06Q 20/40* | (2012.01) |
| *G06Q 20/38* | (2012.01) |
| *G06Q 20/20* | (2012.01) |
| *G06Q 20/22* | (2012.01) |

(52) U.S. Cl.
CPC ......... *G06Q 20/327* (2013.01); *G06Q 20/204* (2013.01); *G06Q 20/223* (2013.01); *G06Q 20/385* (2013.01); *G06Q 20/40* (2013.01); *G06Q 20/405* (2013.01); *G06Q 20/3226* (2013.01)

(58) Field of Classification Search
None
See application file for complete search history.

(56) References Cited

U.S. PATENT DOCUMENTS

| | | | |
|---|---|---|---|
| 5,835,366 A | 11/1998 | Pleso et al. | |
| 6,240,285 B1 | 5/2001 | Blum et al. | |
| 6,327,578 B1 * | 12/2001 | Linehan | G06Q 20/02 705/65 |
| 6,345,180 B1 | 2/2002 | Reichelt | |
| 6,668,179 B2 | 12/2003 | Jiang | |

(Continued)

FOREIGN PATENT DOCUMENTS

WO  2015148850 A1  10/2015

OTHER PUBLICATIONS

German, Kent "Why you want a dual-SIM phone", retrieved at: https://www.cnet.com/news/why-you-want-a-dual-sim-phone/; dated Feb. 28, 2013; 4 pgs.

(Continued)

*Primary Examiner* — Jacob C. Coppola
(74) *Attorney, Agent, or Firm* — Cantor Colburn LLP; Teddi Maranzano

(57) ABSTRACT

A computer-implemented method includes submitting a preauthorization request for a payment to a payment provider. An authorization code associated with a set of final payment criteria is received from the payment provider, where the final payment criteria comprise at least one of a location restriction, a timeframe restriction, a category restriction, and a seller restriction. The authorization code is saved for later use. The authorization code is presented to a seller terminal as a payment for a sale, where the payment is approved based on confirmation that sale data describing the sale complies with the final payment criteria.

12 Claims, 5 Drawing Sheets

(56) References Cited

U.S. PATENT DOCUMENTS

| | | | |
|---|---|---|---|
| 7,255,264 B2 | 8/2007 | De Leon | |
| 8,014,755 B2 | 9/2011 | Sun | |
| 8,369,904 B2 | 2/2013 | Bennis | |
| 8,768,419 B2 | 7/2014 | Sivaraman | |
| 9,565,639 B2 | 2/2017 | Ray | |
| 9,838,861 B2 | 12/2017 | Singh | |
| 2002/0073045 A1* | 6/2002 | Rubin | G06Q 20/367 705/65 |
| 2004/0023679 A1 | 2/2004 | Shoobridge | |
| 2012/0135715 A1 | 5/2012 | Kang et al. | |
| 2014/0025958 A1* | 1/2014 | Calman | G06F 21/33 713/189 |
| 2014/0277277 A1 | 9/2014 | Gordon et al. | |
| 2015/0046324 A1 | 2/2015 | De La Cropte De Chanterac et al. | |
| 2015/0100468 A1* | 4/2015 | Blackhurst | G06Q 40/02 705/35 |
| 2016/0189131 A1* | 6/2016 | Williams | G06Q 20/327 705/39 |
| 2018/0096405 A1 | 4/2018 | Cho | |
| 2018/0226697 A1 | 8/2018 | Edwards | |
| 2019/0129865 A1 | 5/2019 | Fenster | |

OTHER PUBLICATIONS

Chan et al., "Specialized Secondary Compartment in a Mobile Device," U.S. Appl. No. 16/149,174, filed Oct. 2, 2018.
List of IBM Patents or Patent Applications Treated as Related; Date Filed: Oct. 2, 2018, 2 pages.
Merritt, C. (2011). Mobile money transfer services: the next phase in the evolution of person-to-person payments. Journal of Payments Strategy & Systems, 5(2), pp. 143-160. Aug. 2010.

* cited by examiner

PREAUTHORIZATION OF MOBILE PAYMENTS EXPECTED IN A REDUCED-FUNCTIONALITY STATE

BACKGROUND

The present invention relates to mobile payments and, more specifically, to preauthorization of mobile payments expected in a reduced-functionality state.

Smartphones are widespread, and their functionality is continuously expanding. As the usefulness of these devices increases, so does people's reliance on them. When smartphones were first introduced, they were useful for their various communication mechanisms, such as phone calls, text messages, and emails, as well as their ability to store information in an organized manner, such as through digital calendars. Now, however, smartphones also incorporate mobile payments systems, tickets with barcodes, and other documents and functionality that people rely on for everyday tasks.

For use in mobile payments, some smartphones incorporate near-field communication (NFC) technology. A user provides such a smartphone with credit or debit card information for each card that the user desires the smartphone to use for payments. Upon authorization from the user, the smartphone communicates with a point-of-sale (POS) terminal, using an integrated NFC device, to transmit the credit card or debit card information to the POS terminal. As such, the mobile phone is able to facilitate payment without providing the actual credit or debit card to the POS terminal.

SUMMARY

Embodiments of the present invention are directed to a computer-implemented method for making payments. A non-limiting example of the computer-implemented method includes submitting a preauthorization request for a payment to a payment provider. An authorization code associated with a set of final payment criteria is received from the payment provider, where the final payment criteria comprise at least one of a location restriction, a timeframe restriction, a category restriction, and a seller restriction. The authorization code is saved for later use. The authorization code is presented to a seller terminal as a payment for a sale, where the payment is approved based on confirmation that sale data describing the sale complies with the final payment criteria.

Embodiments of the present invention are directed to a system for making payments. A non-limiting example of the system includes a memory having computer-readable instructions and one or more processors for executing the computer-readable instructions. The computer-readable instructions include submitting a preauthorization request for a payment to a payment provider. Further according to the computer-readable instructions, an authorization code associated with a set of final payment criteria is received from the payment provider, where the final payment criteria comprise at least one of a location restriction, a timeframe restriction, a category restriction, and a seller restriction. The authorization code is saved for later use. The authorization code is presented to a seller terminal as a payment for a sale, where the payment is approved based on confirmation that sale data describing the sale complies with the final payment criteria.

Embodiments of the invention are directed to a computer-program product for making payments, the computer-program product including a computer-readable storage medium having program instructions embodied therewith. The program instructions are executable by a processor to cause the processor to perform a method. A non-limiting example of the method includes submitting a preauthorization request for a payment to a payment provider. Further according to the method, an authorization code associated with a set of final payment criteria is received from the payment provider, where the final payment criteria comprise at least one of a location restriction, a timeframe restriction, a category restriction, and a seller restriction. The authorization code is saved for later use. The authorization code is presented to a seller terminal as a payment for a sale, where the payment is approved based on confirmation that sale data describing the sale complies with the final payment criteria.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
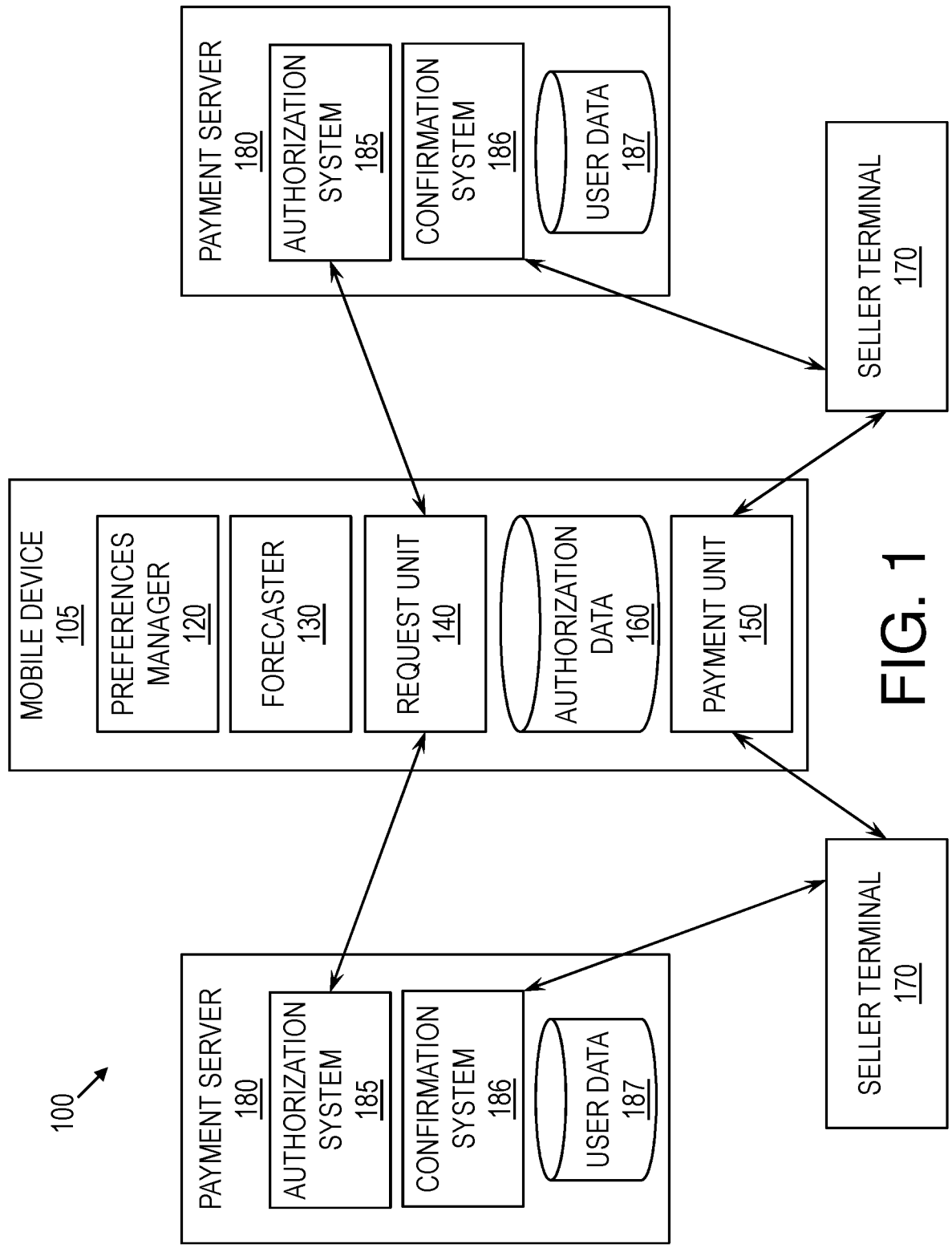
FIG. 1 is a block diagram of a payment system for preauthorizing payments expected in a reduced-functionality state, according to some embodiments of this invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, people have come to rely heavily on smartphones and other mobile devices for their everyday needs. In some countries, it is common to go out without a wallet, relying fully on a smartphone for mobile payments, among other tasks. Popular international mobile payment methods, such as Alipay and WeChat pay, require a user to open a payment application and connect to a network in real time. If a smartphone has low power, however, then the smartphone may be unable to support the application launch and network connection. As a result, the user loses his or her ability to make payments. This can be a crucial loss in some instances, such as when a user relies on mobile payments to complete everyday errands or to pay for transportation home or elsewhere.

Turning now to an overview of the aspects of the invention, one or more embodiments of the invention address the above-described shortcomings of the prior art by providing a mechanism to pre-authorize payments and to use the resulting authorizations when a mobile device is in a reduced-functionality state or otherwise. According to some embodiments of the invention, when a payment system described herein predicts that a payment is expected to be made by a user during a low-power state, which may be a reduced-functionality state, then before the low-power state occurs, the preauthorization system automatically contacts a payment provider to preauthorize the payment. Upon approval, a resulting authorization may be associated with payment criteria. When the authorization is presented at a seller terminal of a seller (e.g., a merchant or service provider) in payment for a sale, the seller terminal may communicate with the payment provider to verify that the sale meets the payment criteria for the authorization. If so, then the sale is approved, and the payment provider provides funds to the seller for the payment.

The above-described aspects of the invention address the shortcomings of the prior art by enabling a user to make payments when a mobile device is operating with reduced functionality. As a result, a user can rely confidently on having access to mobile payments, without having to worry that normal usage of the mobile device will drain the battery enough to impact the user's ability to make payments.

Turning now to a more detailed description of aspects of the present invention, FIG. 1 is a block diagram of a payment system 100 for preauthorizing payments expected in a reduced-functionality state, according to some embodiments of this invention. As shown in FIG. 1, the payment system 100 may be incorporated, in whole or in part, in a mobile device 105, such as a smartphone, tablet, or other computing device. The payment system 100 may include a preferences manager 120, a forecaster 130, a request unit 140, a payment unit 150, and authorization data 160. Generally, the payment system 100 may obtain and use authorizations for payments from one or more payment providers. An authorization may be tendered to a seller (e.g., a merchant or service provider), through a seller terminal 170, as payment in place of a payment card and in lieu of conventional mobile payment systems.

As discussed further below, a mobile device 105 may be, but need not be, in a reduced-functionality state. For example, and not by way of limitation, when a mobile device 105 falls into a low-power state, certain functionality of the mobile device 105 will typically become unavailable, either to reserve power or because sufficient power is not available to support the functionality. Thus, in some embodiments of the invention, a low-power state is possibly a reduced-functionality state, but a reduced-functionality state may result from other circumstances as well. For instance, if an internal component of the mobile device 105 malfunctions or is unable to work as usual, this may result in a reduced-functionality state, where that internal component is not able to be used. More specifically, if a camera of the mobile device 105 malfunctions, then the mobile device 105 may be unable to scan a barcode, such as a Quick Response (QR) code; if a screen malfunctions, then the mobile device 105 may be unable to display a QR code or other barcode for a conventional mobile payment system; or if a fingerprint scanner or NFC device fails, then conventional authorization or conventional transmission, respectively, of payment data cannot occur for a conventional mobile payment system. For another example, if a mobile device 105 is unable to access a communication network, for instance, due to poor service or due to signal blockage by a building, then the mobile device 105 may be in a reduced-functionality state.

With the payment system 100 described herein, however, authorizations can be obtained and saved so that they can be used when the mobile device 105 is in a reduced-functionality state. The use of such authorizations need not require traditional functionality that is required for conventional mobile payment systems. Rather, in some embodiments of the invention, an authorization can be used through the simple display of a barcode on the screen of the mobile device 105, or through device-to-device transfer with or without the use of the display. No network connection is needed on the part of the mobile device 105, according to some embodiments of the invention.

Together, the preferences manager 120, the forecaster 130, the request unit 140, and the payment unit 150 may perform the tasks discussed herein to enable operation of the payment system 100. Generally, the preferences manager 120 may maintain preferences of the user that are applicable to automatically acquiring preauthorizations, also referred to herein as authorizations; the request unit 140 may communicate with one or more payment servers 180 to request authorizations of payments on the user's behalf, and the request unit 140 may store approved authorizations in the authorization data 160; and the payment unit 150 may present authorizations to seller terminals 170 to facilitate a payment that has been preauthorized. Optionally, the forecaster 130 may predict payments that are expected to be made when the mobile device 105 is in a low-power state, as a low-power state may be a reduced-functionality state. Each of the preferences manager 120, the forecaster 130, the request unit 140, and the payment unit 150 may include hardware, software, or a combination of both. For example, and not by way of limitation, each of these components may be a specialized hardware device, a software module, or a combination of both. Further, although these components are shown in FIG. 1 as distinct, this distinction is made for illustrative purposes only, and the preferences manager 120, the forecaster 130, the request unit 140, and the payment unit 150 may share overlapping hardware or software, or may be further divided. For instance, each such component may be integrated into a common software package on the mobile device 105.

One or more payment providers may participate in the payment system 100. Each participating payment provider may operate a payment server 180. The payment server 180 may include one or more computing devices or portions of computing devices, and the payment server 180 may be distributed rather than existing in a single device. The payment server 180 may include an authorization system 185 and a confirmation system 186. Generally, the authorization system 185 may communicate with mobile devices 105 participating in the payment system 100 to pre-authorize payments for users, based at least in part on user data 187 describing the users, and the confirmation system 186 may communicate with seller terminals 170 to facilitate payments based one existing authorizations. Although only a single mobile device 105 is shown in FIG. 1, it will be understood that many mobile devices 105 may be in communication with each payment server 180 to enable users at those mobile devices 105 to make payments through the associated payment provider.

The preferences manager 120 may receive, from a user of the mobile device 105, a set of one or more user preferences for operation of the payment system 100. In some embodiments of the invention, the payment system 100 is able to operate autonomously, with or without intervention from the user, to acquire payment authorizations on the user's behalf based on user preferences or predictions of payments that will be needed, or both. For example, and not by way of limitation, the user preferences may include one or more of the following: a maximum amount allowed for each authorization; a maximum amount allowed for a total of active authorizations, a danger threshold associated with the power level of the mobile device 105; a low-power threshold also associated with the power level of the mobile device 105; an indication of which payment providers are approved by the user; an order of preference of payment providers; and a prioritization order of generic authorizations versus specific authorizations.

A user may explicitly request an authorization. Additionally or alternatively, the forecaster 130 may request one or more authorizations automatically, based at least in part on predictions about payments the user is expected to make when the mobile device is in a low-power state. With respect to the forecaster 130, two thresholds may be relevant, according to some embodiments of the invention: a danger threshold and a low-power threshold. The low-power threshold may define when the mobile device 105 is in a low-power state, such that the mobile device 105 is in the low-power state when its current power level is below the low-power threshold. The danger threshold may define when the mobile device 105 is in danger of entering the low-power state soon. The danger threshold may be used as a marker to establish when the forecaster 130 begins generating authorization requests based on predictions of payments that will be needed. In some embodiments of the invention, however, no danger threshold is used, and the forecaster 130 is free to make predictions about payments at any time or based on some other timing parameter. Both the low-power threshold and the danger threshold may be system-defined or user-defined. For example, and not by way of limitation, an operating system of the mobile device 105 may define the low-power threshold, and the user preferences may define the danger threshold. For instance, either threshold may be defined as a percentage of total power, such as 30% remaining, or as an estimated remaining running time, such as an hour.

In some embodiments of the invention, additionally or alternatively to the thresholds described above, one or more timing parameters may be defined. For example, and not by way of limitation, a certain time (e.g., six hours) in advance of an expected event, the forecaster 130 may generate a request for payment associated with that event, regardless of the danger threshold or the low-power threshold. Further, in some embodiments of the invention, the forecaster 130 may make predictions periodically (e.g., every thirty minutes) about payments for a given interval (e.g., the next six hours) and may generate requests based on such predictions.

In some embodiments of the invention, the forecaster 130 predicts what payments the user will make during a critical period, which is a period of time forecasted to be related to the low-power state. The forecaster 130 may ensure that necessary authorizations are requested in advance of the mobile device 105 entering the low-power state, such that those authorizations can be used when the mobile device 105 is in the low-power state to facilitate payments without the use of the mobile device's full functionality. When the power of the mobile device 105 falls below the danger threshold, the forecaster 130 may mark that as the start of the critical period and may predict the end of the critical period, for instance, based on when the mobile device 105 is expected to be charged. Various mechanisms are known in the art for predicting device usage based on usage history, and one or more of such mechanisms may be used to predict the end of the critical period. For example, and not by way of limitation, all the times at which the mobile device 105 was plugged in for recharging on the current day of the week for the past three months may be considered, with outliers excluded, and the latest remaining time may be used as the prediction of the end of the critical period.

When the mobile device 105 enters the critical period (e.g., by falling below the danger threshold), the forecaster 130 may predict the end of the critical period and may also predict which payments the user will make until that end of the critical period. More specifically, the forecaster 130 may determine payments likely to be made based on historical usage data of the mobile device 105, based on a calendar stored on the mobile device 105, based on communications, or based on other data available to the forecaster 130. For example, and not by way of limitation, the historical usage data may include historical mobile payments. Communications available to the forecaster 130 may include emails, text messages, and social networks, for example. Various mechanisms known in the art may be used to determine tasks the user is likely to perform on a given day, based on historical usage data. Using one or more of such mechanisms, the forecaster 130 may predict payments likely to be needed during the critical period. Further, in some embodiments of the invention, the forecaster 130 generates requested payment criteria for a predicted payment, based on predicted information about the predicted payment. For example, and not by way of limitation, the requested payment criteria may place a restriction on one or more of location, timeframe, purchase category, and seller information (e.g., seller identifier, or seller type). With this requested payment criteria, the forecaster 130 may generate a request for a payment, to be forwarded to the request unit 140 for handling.

For example, upon falling beneath the danger threshold and into the critical period, the forecaster 130 may introspect a calendar on the mobile device 105, and may thus identify events, such as a movie or a baseball game, scheduled for later on the same day, prior to the end of the critical period. Given this information, the forecaster 130 may automatically prepare a request for one or more authorizations to enable the user to pay for entry to such events. For an authorization for one of such events, the requested payment criteria may include the location of such an event as indicated by the calendar, possibly with a range provided for error, as well as an expected time range of the event. Further, the authorization may indicate the expected cost of the event, which may be determined based on past authorizations for similar events or based on reference to a database that indicates expected costs of various events, for example. For another example, if it is determined that the user usually requires access to public transportation at a time that falls within the critical period, then the forecaster 130 may request an authorization for a payment for that public transportation.

For another example, if the forecaster 130 determines that the user is likely to buy groceries that evening, at a time that falls within the determined critical period, then the forecaster 130 may generate a request for that payment. Based on prior grocery store purchases around that time and that day of the week, the amount indicated in the request may be $150. If the location of grocery purchase varies but is usually along the user's route home, then a location range may be indicated corresponding to a range around that route. Further, if the grocery purchase typically falls between six o'clock and nine o'clock in the evening, then the requested payment criteria may indicate that timeframe. As such, the forecaster 130 may generate a request that seeks to protect the payment provider from unauthorized use or from misuse of the funds, by using requested payment criteria that narrowly defines that expected purchase.

If no location can be determined for a predicted payment, then the forecaster 130 may either provide no location restriction in the requested payment criteria, or the forecaster 130 may provide a location restriction based on a current location of the mobile device 105. For example, and not by way of limitation, if no particular payment is predicted but the user preferences indicate that the user would like to have a generic authorization available, then the forecaster 130 may generate a request for a generic authorization to be used during the critical period. More specifically, for example, a limit of one hundred dollars may be requested for the purchase of anything. However, in this case, to limit the payment to some degree, the forecaster may determine the current location of the mobile device 105 and may indicate in the requested payment criteria that the payment is to be limited to a specified range around the current location. The specified range may be based on the user preferences or on a historical record of approvals and rejections, for example, such that a location range that is likely to be approved is selected.

In some embodiments of the invention, the amounts included in requests may be based at least in part on the user preferences. For instance, if the user indicates in the user preferences that no authorization should exceed a defined maximum amount, then the forecaster 130 may be unable to generate a request for more than this defined maximum. For another example, if the user indicates in the user preferences that an authorization for a certain type of purchase should not exceed a certain amount, then when generating a request for an authorization for that type of purchase, the forecaster 130 may be unable to do so for more than that certain amount. For another example, the user preference may specify a buffer amount, such as twenty percent, above a predicted amount for a payment. For instance, if the forecaster 130 predicts that a lunch will cost twenty dollars, and the buffer in the user preferences is twenty percent, then the forecaster 130 may generate a request for twenty-four dollars, which includes the buffer. In that case, when generating the corresponding request, the forecaster 130 may add the indicated buffer to the amount requested.

In some embodiments of the invention, whether the forecaster 130 generates a request for a generic authorization or for a set of individual authorizations, or a combination of both, based on predicted payments may be determined at least in part by the user preferences. For instance, if the user preferences indicate that the user prefers generic authorizations, then the forecaster 130 may generate one request to cover all predicted payments for the critical period. However, historical rejections and approvals from payment providers may also be considered. For instance, if a payment provider is historically more likely to approve requests for specific authorizations (e.g., for individual purposes), then the forecaster 130 may generate one or more requests for individual authorizations to be sent to that payment provider.

In some embodiments of the invention, the forecaster 130 may select specific payment providers to receive requests that are generated by the forecaster 130. Alternatively, however, the forecaster 130 may simply generate requests and may allow the request unit 140 to make determinations about which payment providers receive the requests. As discussed further below, if a request is rejected by a first payment provider, the payment system 100 may transmit the request to one or more other payment providers either as a group or in turn, and the selection of the payment providers may be based on user preferences or on a history of approvals and rejections.

The forecaster 130 may make predictions and generate requests in the background, with or without disturbing the user, and the request unit 140 may transmit the requests to payment servers 180 also in the background. As such, when the mobile device 105 goes into the low-power state, the authorizations may already be available for use in the authorization data 160.

In some embodiments of the invention, authorizations approved corresponding to requests initiated by the forecaster 130 may expire when a set of safe-zone criteria are met. For instance, when the mobile device's power exceeds the danger threshold again, or when the mobile device 105 is no longer in the low-power-state, or when the mobile device 105 is recharging, the safe-zone criteria may be deemed to be met, and the authorizations whose requests were initiated with the forecaster 130 may thus expire. This expiration requirement may be provided in the request, as part of the requested payment criteria, for example. Alternatively, this expiration requirement may be provided by the payment server 180 responsive to identifying in the request data that the request was made based on an automated prediction. Further, in some embodiments of the invention, if the mobile device 105 is not in a reduced-functionality state at the time a payment is being made, the authorization for such payment may be canceled, and the mobile payment may go through standard payment processing, such as by way of a conventional mobile payment system.

In some embodiments of the invention, the request unit 140 receives preauthorization requests from the user or the forecaster 130, or both, and communicates with one or more payment servers 180 to obtain authorizations corresponding to such requests. For instance, a requestor (e.g., the user explicitly, or the forecaster 130) may request an authorization for a payment. The request may include one or more requested payment criteria. The requested payment criteria may reflect an intended use of the authorization and may indicate requirements for making the payment later. For example, and not by way of limitation, requested payment criteria may include one or more of the following: an expected cost, which may be a range; an expected category (e.g., groceries, prepared food, electronics, transportation services); an expected point of purchase (e.g., the grocery store, city train); an expected time, which may be a range (e.g. 5:00-6:00 pm); an expected location, which may be a range (e.g., within a specific radius of a GPS location or within a specific distance from a route); and expected information about the seller, such as a seller identifier or seller type. In some embodiments of the invention, the payment system 100 may have an established set of fields (e.g., amount, location, seller identifier, seller type, single or multiple use, transferability) for payment criteria, and the requested payment criteria may include a value, representing a restriction or lack thereof, in each field.

Additionally, the request may include request data, which may describe, for example, a reason for the request, a source of the request, a requestor (e.g., the user or the forecaster 130), or a confidence level associated to the request. For example, if the request was received through explicit entry by the user, then the user may provide request data describing the reason for the request. In some embodiments of the invention, the request unit 140 enables the user to select one or more of a pre-established set of reasons to be included in the request data. For another example, if the request was received from the forecaster 130, the request data may indicate the basis for which a payment is predicted to be needed. For instance, the forecaster 130 may indicate that the user has made a particular payment on 80% of Fridays, and thus, given that the current day is Friday, the particular payment is predicted with 80% confidence. For another example, suppose a movie ticket invoice is emailed to the user, and thus received at the mobile device 105, with a total payment amount and a request to "pay at the door." The resulting authorization request may be sent to the payment provider with a one hundred percent confidence level, indicating that the request was based on an explicit invoice. For another example, the basis of request could be data identified in a social network, the user's calendar, or text messaging, and in that case, this basis may be indicated as the source of the request.

In some embodiments of the invention, additionally or alternatively to a full request being associated with a confidence level, various factors of the request may be associated with respective confidence levels, which may contribute to an overall confidence level of the request.

For example, each source may be associated with a static confidence level or a dynamically learned confidence level. For instance, it is possible that the user's work calendar is more trustworthy than the user's personal calendar; therefore, a request associated with predicted payment that is based on the work calendar may be assigned a higher confidence level than a request associated with a predicted payment based on the personal calendar. Alternatively, a confidence level assigned to the request as whole may be weighted or boosted based on the source, such that request based on the work calendar may get a ten percent boost, for example. In some embodiments of the invention, the forecaster 130 is able to learn from past predictions, based on whether predicted payments were actually made as well as based on other factors, such as source of such predicted payments. As such, a confidence level or confidence level boost assigned to each source may be dynamic, based on historical data.

The identity of the requestor may also contribute the confidence level assigned to a request for an authorization. In some embodiments of the invention, for instance, a request generated on explicit instruction from the user or confirmed by the user may be assigned a high confidence level, such as one hundred percent. Confirmation of a request may occur by various means, such as by selecting an option to confirm when presented with a potential request, or by authentication, such as through a finger printer reader, password entry, or facial recognition.

Upon receiving a request, the request unit 140 may transmit the request to one or more payment providers, specifically, to one or more payment servers 180 of one or more payment providers. If the request indicates a specific set of payment providers, then the request unit 140 may transmit the request to that indicated set, either one at a time or all at once. However, if no payment providers are specified in the request, then the request unit 140 may select which of the payment providers will receive the request. The selection may be based on the user preferences, for instance. For example, if the user preferences prioritize the payment providers, then the highest priority payment provider may be selected to receive the request. For another example, if the user preferences indicate that each payment provider approved by the user should receive the request in turn, after rejection by a request to a prior payment provider, then a first payment provider may be selected, and another may be selected after the first payment provider has rejected the request.

If a rejection of a request is received from a payment server 180, thus indicating that the associated payment provider has rejected the request, then the request unit 140 may decide whether to send the request to another payment provider. Whether to send the request to another payment provider may be decided based, at least in part, on the user preferences. In some embodiments of the invention, if all payment providers approved by the user have received and rejected the request, then no authorization is recorded corresponding to the request. Further, if all payment providers receiving a request reject that request, then the request unit 140 may ask the user to confirm the user's need for the payment, particularly if the request was initially generated by the forecaster 130. For instance, if a payment provider requests explicit confirmation, then the request unit 140 may ask the user for such confirmation, or the request unit 140 may do so automatically upon receiving one or more rejections. A confirmation may increase the confidence level of the request and may thus cause a different decision from a payment provider. Further, in some embodiments of the invention, a payment provider may ask the user for a sharing of responsibility for potential payment fraud related to the authorization request, in which case, with the confirmation, the user may agree to a percentage responsibility.

If a payment provider approves a request, then the payment server 180 may transmit an authorization, also referred to as a preauthorization or an approval, to the request unit 140. The authorization may include one or more of the following: an authorization code; identification of the corresponding request that is approved; an identifier of the payment provider; a payment amount, which may be a range or a maximum; and payment criteria. The authorization code may encode enough information to enable the use of the authorization for payment. For instance, the authorization code may encode at least, for instance, a provider identifier that uniquely identifies the payment provider to sellers and an authorization identifier that uniquely identifies the authorization to the applicable payment provider and payment server 180. For example, the authorization code may be alphanumerical, or it may be a barcode, such as a QR code. In some embodiments of the invention, if no barcode is received from the payment server 180, then the request unit 140 generates a barcode corresponding to the authorization, specifically including the authorization code received.

The amount approved may be a maximum value or a range, and this amount may, but need not, be the same as the amount in the request. In some cases, the payment server 180 may approve an amount different than the amount requested. For instance, this may be due to a lack of creditworthiness of the user, from the perspective of the payment provider, or this may be due to the payment server 180 having determined that the amount requested was higher than necessary given the request data. The payment criteria may match the requested payment criteria, or the payment criteria may differ, such as by being stricter in requirements so as to further the limit possible transactions stemming from the authorization. Generally, the payment criteria may include a value, such as a restriction or a lack thereof, corresponding to each field an established set of fields used by the payment system to define payment criteria.

Depending on the payment criteria indicated in the approval, an authorization may be used for a single purchase or for multiple purchases. For instance, the payment criteria may be strict, requiring a specific location, maximum amount, and merchant, and might further indicate that the authorization is for a single use. Alternatively, for another example, the payment criteria for an authorization might indicate a maximum amount and a time limit, while not indicating a location or merchant, and may allow multiple uses within the allotted time limit as long as the maximum amount is not exceeded. In that case, the authorization may be used multiple times.

In some cases, an authorization may be transferable, if allowed by the payment criteria. Alternatively, however, an authorization may be used only by the user for whom it was requested. In some embodiments of the invention, by default, an authorization is usable only by the user for whom it was requested unless the payment criteria explicitly allow the transfer.

Upon receiving each authorization, the request unit 140 may store the authorization, including the authorization code and the payment criteria, in the authorization data 160. Later, the authorizations in the authorization data 160 may be used to make payments when the mobile device 105 is in a reduced-functionality state or otherwise.

The payment unit 150 may manage local operations needed to facilitate payment according to the authorizations in the authorization data 160. For instance, the payment unit 150 may present authorization codes to sellers as needed. In some embodiments of the invention, the payment unit 150 is able to operate without access to the internet or other network. However, the seller may have a network connection to facilitate the payment.

The user may present an authorization code to the seller to complete a sale, such as by displaying to the seller a QR code or other barcode corresponding to the authorization. The seller may scan or otherwise take record of the authorization, for instance, with a seller terminal 170 used at the point of sale. The authorization code may encode an identifier of the payment provider, and as such, the seller terminal 170 may be directed to communicate with the payment server 180 of the payment provider. The seller terminal 170, automatically or at the request of the seller, may communicate a payment request to the payment server 180 to complete the sale. The payment request may include sale data and the authorization code.

Before a payment is approved based on an authorization, the payment criteria associated with that authorization may be confirmed. The sale data may describe the transaction, including, for example, location (e.g., GPS location of the seller terminal 170), purchase amount, merchant identifier, and type of goods or services to be purchased. Generally, the sale data may include values in the same fields as those included in payment criteria, and thus, the sale data transmitted may include enough information to determine whether the payment criteria are met. Upon receiving the sale data from the seller terminal 170, the payment server 180 may compare the sale data to the payment criteria to confirm that the circumstances of the payment fall within the payment criteria.

In some embodiments of the invention, the payment provider has the option to request authentication from the user. If the payment provider opts to exercise this option, then, responsive to the payment request, the payment server 180 may transmit to the seller terminal 170 a request for authentication by the user. The type of authentication may be dependent, at least in part, on the capabilities of the seller terminal 170. For example, and not by way of limitation, if the seller terminal 170 can capture a photograph, then the seller may use the seller terminal 170 to do so upon request from the payment server 180, and the photo may be transmitted to the payment server 180 for authentication by facial recognition. Additionally or alternatively, for example, the seller terminal 170 may record the user's fingerprint for verification by the payment server 180, or the user may be required to answer one or more personal questions to the seller terminal 170 for verification by the payment server 180. After this confirmation process, the payment server 180 may approve the payment to the seller if the payment criteria are met and if any requested authentication is successful. If the payment is confirmed, the payment provider may transfer, to the seller, funds corresponding to the payment.

As discussed above, the payment system 100 may be associated with one or more participating payment providers, each of which may be associated with a payment server 180. Upon receiving a request for a new authorization, the payment server 180 may decide whether to approve the request and issue an authorization. In some embodiments of the invention, approval or rejection is performed automatically, and the decision of whether to approve or to reject a request is based, at least in part, on user data 187 describing users known to the payment server 180. In some embodiments of the invention, one or more scores in the user data 187 are associated with each user to determine whether to approve or reject each authorization request.

Embodiments of the payment system 100 may be especially useful for a user who does not have a credit card or a credit history. In that case, rather than the user having a line of credit or a current balance with a payment provider, authorizations may be made with the payment system 100 on a case by case basis. For instance, for a particular user, the user data 187 may include a respective user score. The user score may be an indication of creditworthiness as determined by the payment provider for the respective user. For instance, if the payment provider requires repayment by the user after use of an authorization to make a payment, then the user score may reflect the consistency with which is user makes such repayments. In some embodiments of the invention, the payment server 180 may also generate a request score for each request received for an authorization. The request score may reflect confidence that the payment is needed or likelihood that a payment is fraudulent. For example, and not by way of limitation, the request score may be based on the request data provided from the request unit 140 of the mobile device 105 when requesting an authorization, where the request data may include one or more of the following: whether the preauthorization is being explicitly requested by the user or automatically requested based on prediction, the user's history of making purchases similar or the requested preauthorization. One or more of the user score and the request score may be used to determine whether approval is granted. For example, and not by way of limitation, a weighted average of the two scores may be calculated, and if the weighted average meets (e.g., equals or exceeds) an approval threshold, then the request may be approved.

In some embodiments of the invention, for each authorization request received, a payment server 180 can approve, reject, or request additional information, such as authentication. A request for additional information may be applied with similar logic as used by a traditional credit card company to identify fraud risk for a payment. In other words, at the time of receiving a request, the payment server 180 may perform a fraud screening by requesting additional information. Further, fraud prevention may be incorporated into the payment server's choice of final payment criteria for an approved authorization.

Upon approval of a request, a resulting authorization may be generated and transmitted to the request unit 140 that requested the authorization. As discussed above, the authorization may be or may include an authorization code, which may be embodied in a barcode. The authorization code may be a unique identifier by which the payment server 180 can recognize the authorization. The payment server 180 may retain a record of each authorization and associated payment criteria, so as to approve or reject a payment when the user attempts to use the authorization. Further, upon approval, if the user has an account of available funds with the payment provider, the available funds may be, at least temporarily, reduced by the amount of the authorization. When the authorization is fully used (i.e., such that the authorization cannot be reused due to the payment criteria) or expires, then any remaining amount on the authorization may be credited back to the user's account.

In some embodiments of the invention, as discussed above, a payment server 180 can require that user authentication be performed before an existing authorization can be used as payment. For at least this purpose, the payment server 180 may maintain in the user data 187 a user account associated with each user for whom authorizations have been approved. The user account may maintain authentication data that the user may be required to match to use an authorization issued by the payment server 180 for the user. For instance, this authentication data may be a record of a fingerprint, a photo, or a set of security questions and answers. However, in some cases, if allowed by payment criteria, an authorization may be transferable. This may be useful, for example, in the case of a parent desiring to obtain credit for a child, where the child has no history with the payment server 180. For instance, an authorization may be requested by a parent and then transferred to a child's account and to the child's mobile device 105. As requested by the parent in the initial request, the payment criteria may limit the payment to purchase of a textbook in a specific school bookstore. Further, the payment criteria may, but need not, require the child to authenticate himself or herself to the mobile device 105 during the payment.

In the case of a transfer, the user may notify the payment server 180 of the transfer and the transfer recipient. In this case, the recipient of the transferred authorization may be required to establish an account with the payment server 180, if such an account does not yet exist. The authorization may then be moved to the recipient's account, such that, if user authentication is required, then authentication of the recipient user may suffice. Further, in some embodiments of the invention, an authorization may be shared across two or more users, such that authentication of any of such users associated with the authorization may suffice when the authorization is used.

As will be discussed further below, the payment server 180 may confirm a payment when a user presents an authorization to a seller terminal 170. In some embodiments of the invention, the payment server 180 provides some flexibility in the final payment criteria based on importance or other factors, such that a payment based on an authorization may be approved even if the payment criteria are not strictly met. For example, the payment server 180 might approve a payment to a restaurant that has a different identity from a restaurant identifier in the corresponding payment criteria finalized during preauthorization, when the time rang and, payment amount range are within the payment criteria, or when the restaurant is within half a mile of the restaurant identified in the payment criteria. In that case, the final approval may be based on the rationale that the user might choose to eat at a different restaurant, and the payment provider wants to provide flexibility to users by ranking the restaurant identity with a relatively low importance.

As discussed above, the forecaster 130 may plan ahead to ensure that authorizations are obtained for use during a later reduced-functionality state. In some embodiments of the invention, the mobile device 105 may operate in one of two modes at a given time: a primary mode and a secondary mode, as discussed below. Throughout this disclosure, certain activities are described as occurring when the mobile device 105 is in a reduced-functionality state. In some embodiments of the invention, when the mobile device 105 implements the compartmentalization system discussed below, this reduced-functionality state coincides with the secondary mode of the mobile device 105. As described below, the compartmentalization system may be configured to reserve power to enable the use of authorizations for payment in this secondary mode. However, it will be understood by one skilled in the art that a mobile device 105 that does not implement the compartmentalization system may also be configured to utilize authorizations as described herein.

Figure 2:
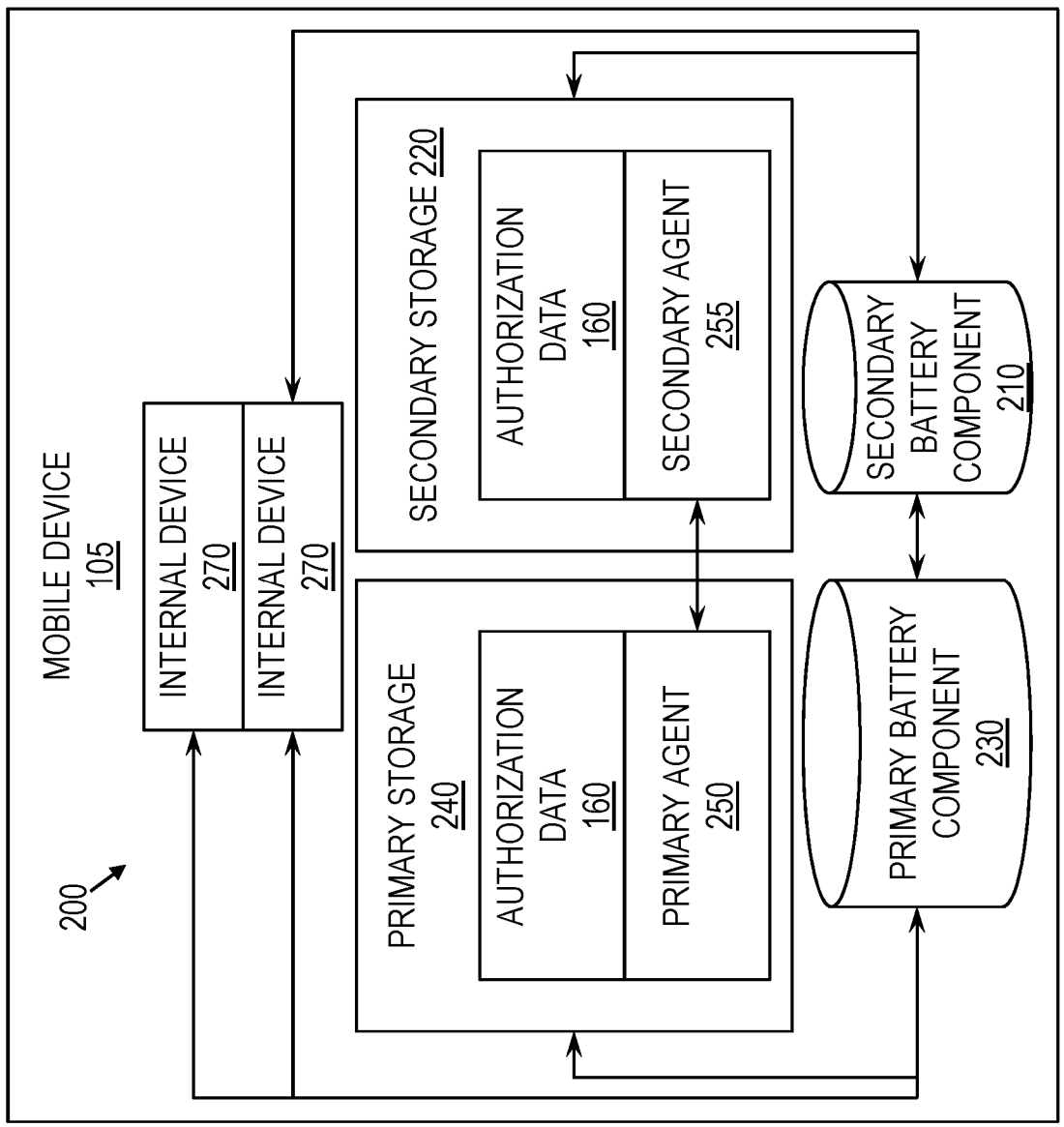
FIG. 2 is a block diagram of a mobile device implementing a compartmentalization system for maintaining authorizations, according to some embodiments of the invention.

FIG. 2 is a block diagram of a mobile device 105 implementing a compartmentalization system 200 for maintaining authorizations, according to some embodiments of the invention. Generally, with the compartmentalization system 200, the mobile device 105 may include a secondary battery component 210 and a secondary storage 220, which may be in addition to a primary battery component 230 and a primary storage 240. As shown in FIG. 2, the primary battery component 230 may power the primary storage 240, while the secondary battery component 210 may power the secondary storage 220. Each of the primary storage 240 and the secondary storage 220 may include a respective agent referred to herein as the primary agent 250 and the secondary agent 255 respectively. The primary agent 250 may manage activities of the compartmentalization system 200 that occur when the mobile device 105 is in primary mode, which will be described in more detail below, and the secondary agent 255 may manage activities of the compartmentalization system 200 that occur with the mobile device 105 is in secondary mode, which will also be described below. For instance, the primary agent 250 may run from the primary storage 240 and may be responsible for backing up authorization data 160 to the secondary storage 220, and the secondary agent 255 may run from the secondary storage 220 and may be responsible for delivering the authorization data 160 to a user when the mobile device 105 is in secondary mode and thus in a reduced-functionality state. In some embodiments of the invention, the secondary agent 255 may be active only when the mobile device 105 is in secondary mode.

Generally, the compartmentalization system 200 may enable the existence of the two modes of the mobile device 105: primary mode and secondary mode. The primary battery component 230 and the primary storage 240 may be utilized by the mobile device 105 when the mobile device 105 is in primary mode. For instance, for conventional usage of the mobile device in primary mode (e.g., communications, storage, conventional mobile payment systems, gaming, watching videos, and other functionality), the primary storage 240 and primary battery component 230 may be used for storage and power respectively. As such, various internal devices 270 of the mobile device 105 (e.g., central processing unit (CPU), screen, Bluetooth device, NFC device, fingerprint reader, and other devices) may be connected to the primary battery component 230 and powered by the primary battery component 230 to enable usage of these internal devices 270 in primary mode. Additionally, when the mobile device 105 is in primary mode, the primary agent 250 may occasionally back up authorization data 160 in the primary storage 240 to the secondary storage 220. Further, when the mobile device 105 is in primary mode, the primary battery component 230 may transfer power to the secondary battery component 210 as needed to ensure that the secondary battery component 210 can power the mobile device 105 when the mobile device 105 switches to secondary mode.

When the primary battery component 230 has insufficient charge to power the mobile device 105 in primary mode, then the compartmentalization system 200 may automatically switch the mobile device 105 into secondary mode. For instance, a minimum threshold may be established for the primary battery component 230. When the charge level of the primary battery component 230 is less than the minimum threshold, then the compartmentalization system 200 may switch the mobile device 105 into secondary mode. The minimum threshold may be zero power, for example, such that when the primary battery component 230 is empty, the mobile device 105 switches into secondary mode.

When the mobile device 105 is in secondary mode, the secondary battery component 210 and the secondary storage 220 may provide the user continued access to the authorization data 160 on the mobile device 105, as this authorization data 160 may have been previously backed up to the secondary storage 220. In secondary mode, the mobile device 105 may be powered by the secondary battery component 210, which may be connected to and may power one or more of the internal devices 270 of the mobile device 105 needed for a user to access the authorization data 160. These one or more internal devices 270 may be a subset of the internal devices 270 that are connected to the primary battery component 230 and powered by the primary battery component 230 in primary mode. For example, the internal devices 270 connected to the secondary battery component 210 may be the secondary storage 220 in addition to a proper subset of the internal devices 270 connected to the primary battery component 230. Alternatively, all of the internal devices 270 connected to the primary battery component 230 may also be connected to the secondary battery component 210, but the secondary battery component 210 need not supply power to all of such internal devices 270 in secondary mode.

Thus, the secondary battery component 210 may enable the mobile device 105 to maintain a subset of its functionality in secondary mode. This subset may cause the secondary battery component 210 to drain more slowly than the primary battery component 230 would drain while supporting the various internal devices 270. Depending on the type of access to and use of the authorization data 160 that is desired, one of skill in the art will understand which internal devices 270 of the mobile device 105 are necessary for accessing and utilizing the authorization data 160 in secondary mode and may thus be connected to and connected to the secondary battery component 210.

In some embodiments of the invention, the secondary battery component 210 is a distinct device from the primary battery component 230, but alternatively, the secondary battery component 210 and the primary battery component 230 may be portions of a single battery, such that they are distinct partitions where the partitioning is either virtual or physical. If the primary battery component 230 and the secondary battery component 210 are distinct devices, then the primary battery component 230 may be used to maintain an appropriate power level, also referred to as a charge level, in the secondary battery component 210, as will be described below. If the primary battery component 230 and the secondary battery component 210 are portions of the same battery, then the battery may be physically partitioned or a charge level (e.g., 20%, or 5 hours of running time) of that battery may be assigned to the secondary battery component 210. If a charge level is assigned to the secondary battery component 210, then the remaining charge level may represent the primary battery component 230. In that case, the mobile device 105 may be switched from primary mode to secondary mode when the charge level of the battery falls to the charge level assigned to the secondary battery component 210, in which case the remaining charge represents the secondary battery component 210.

In some embodiments of the invention, the primary battery component 230 and the secondary battery component 210 may have different power consumption characteristics. For instance, in some embodiments of the invention, only the primary battery component 230 is responsible for powering the mobile device 105 when the mobile device is in primary mode, while only the secondary battery component 210 is responsible for powering the mobile device 105 when the mobile device 105 is in secondary mode. Further, if the primary battery component 230 and the secondary battery component 210 are distinct batteries, then the two batteries may utilize distinct battery technologies or materials. In that case, the primary battery component 230 may be better suited for regular use and recharge (e.g., nickel-metal hydride (NiMH)), while the primary battery component 230 may be better suited for holding a charge over a long period of time (e.g., nickel cadmium (NiCd)).

If a single battery is used for the primary battery component 230 and the secondary battery component 210, there may be some drawbacks. For example, due to everyday use of the single battery, the battery may experience wear and tear that is applicable to both the primary battery component 230 and the secondary battery component 210 as both reside on the same battery. This can be avoided to some degree by partitioning the battery and charging the two partitions independently, such that the secondary battery component 210 does not experience as many recharge cycles as does the primary battery component 230. Alternatively, if the secondary battery component 210 is simply assigned a charge level, then that assigned charge level may increase over time to account for the possibility that the ability of the single battery to maintain a charge may decrease over time.

Analogously, the secondary storage 220 may be a distinct storage device from the primary storage 240, but alternatively, the secondary storage 220 and the primary storage 240 may be portions of a single storage device. For example, and not by way of limitation, a single storage device may be partitioned into the primary storage 240 and the secondary storage 220. However, if the primary storage 240 and the secondary storage 220 are distinct devices, then the two may utilize the same or different storage technologies. For example, either or both of the primary storage 240 and the secondary storage may be electrically erasable programmable read-only memory (EEPROM), such as NAND flash memory.

As mentioned above, authorization data 160 of the mobile device 105 may be backed up, or copied, from the primary storage 240 to the secondary storage 220 and maintained on the secondary storage 220. In other words, a copy of the authorization data 160 may be maintained in the secondary storage 220, such as by way of occasional synchronization. For instance, each time the authorization data 160 changes in the primary storage 240, either by addition of a new authorization or expiration or use of an existing authorization, then the copy of the authorization data 160 in the secondary storage 220 may be updated to match the authorization data 160 in the primary storage 240. In some embodiments of the invention, whether an update to the authorization data 160 in the secondary storage 220 occurs at a given time may be based, at least in part, on the charge level remaining in the primary storage 240, which may be indicative of whether the authorization data 160 will soon be needed on the secondary storage 220.

Figure 3:
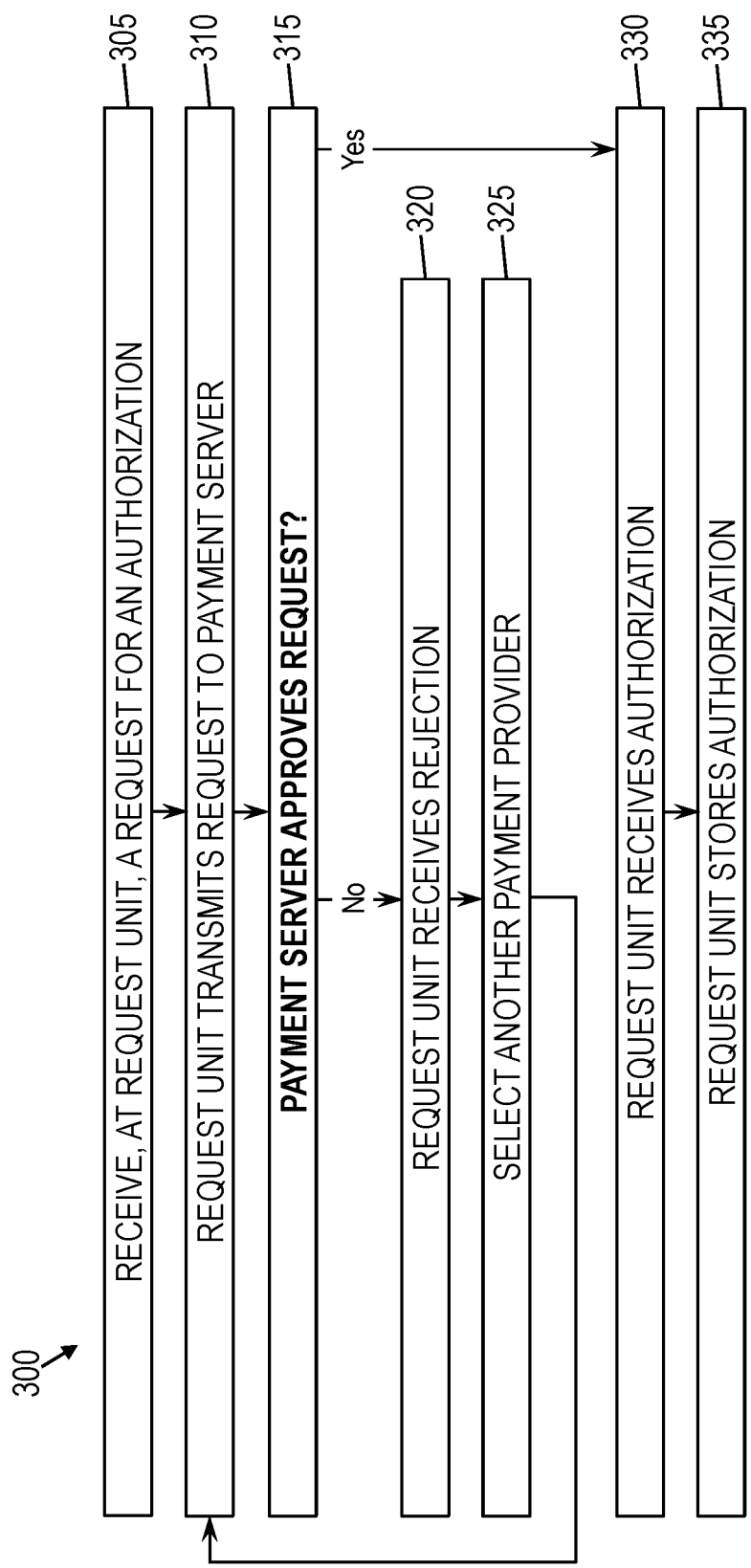
FIG. 3 is a flow diagram of a method of requesting a preauthorization for a payment, according to some embodiments of the invention.

FIG. 3 is a flow diagram of a method 300 of requesting a preauthorization for a payment, according to some embodiments of the invention. As shown in FIG. 3, at block 305, the request unit 140 may receive a request for an authorization. This request may come, for example, from the user or automatically from the forecaster 130. The request may include requested payment criteria, which set boundaries on how the requested authorization would be used. At block 310, the request unit 140 may transmit the request to a payment server 180 associated with a respective payment provider.

At decision block 315, the payment server 180, with or without manual intervention by personnel at the associated payment provider, may determine whether to approve or reject the request. In some embodiments of the invention, the payment server 180 has the option to approve with a modification of the requested payment criteria. If the request is rejected, then at block 320, the payment server 180 may transmit the rejection back to the request unit 140, which receives the rejection. If the request is rejected, then based on user preferences, the request unit 140 may select another payment server 180 to receive the request at block 325. In that case, the method 300 may then return to block 310 to transmit the request to the other payment server 180.

If the request is approved, however, then the payment server 180 may transmit a newly generated authorization to the request unit 140 at block 330, and the request unit 140 may receive that authorization. The authorization may include an authorization code and may also include, or may be associated with, payment criteria. Upon receiving the authorization, at block 335, the request unit 140 may store the received authorization in the authorization data 160. If the compartmentalization system 200 is implemented, then the authorization data 160 may be backed up to the secondary storage 220. In either case, the authorization may be available when the mobile device 105 is in a reduced-functionality state.

Figure 4:
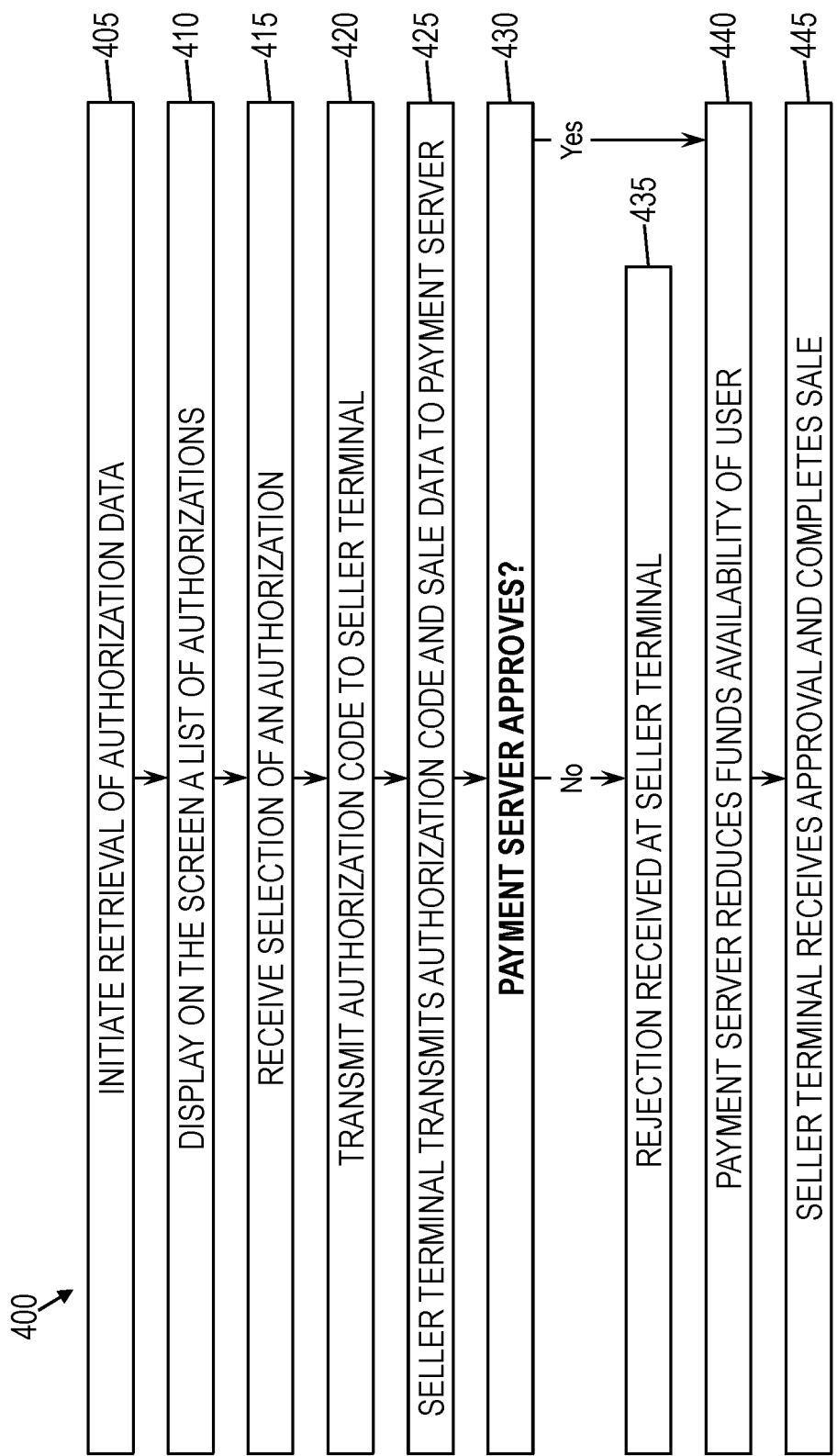
FIG. 4 is a flow diagram of a method of making a payment with an authorization in a reduced-functionality state, according to some embodiments of the invention.

FIG. 4 is a flow diagram of a method 400 of making a payment with an authorization in a reduced-functionality state, according to some embodiments of the invention. While this method 400 is applicable when the mobile device 105 is in a reduced-functionality state, one of skill in the art will understand that the same or similar operations may be used to make a payment through the payment system 100 when the mobile device 105 is not in a reduced-functionality state. Further, it will be understood by one skilled in the art that, if the compartmentalization system 200 is implemented, each internal device 270 of the mobile device 105 utilized in retrieving the authorization data 160 for payment may be connected to and thus capable of being powered by the secondary battery component 210.

At block 405 of FIG. 4, the user may initiate retrieval of the authorization data 160 while the mobile device 105 is in a reduced-functionality state. This initiation may occur by various mechanisms. For example, and not by way of limitation, pressing the home button twice may be interpreted as an implicit instruction to initiate such retrieval, or authentication of the user through the use of a fingerprint scanner integrated into the mobile device 105 may be interpreted as such an instruction. For another example, if the current functionality of the mobile device 105 allows, the user may open a software application associated with the payment system 100 so as to retrieve authorization data.

At block 410, the screen may turn on and display a list of available authorizations in the authorization data 160. In some embodiments of the invention, if a location service, such as GPS, is available on the mobile device 105, then the list of available authorizations may be filtered to only display those for whom any location requirements in the payment criteria are met by the current location. At block 415, the payment system 100 may receive a selection of a list item representing an authorization. This selection may be received when the user touches the screen to make the selection, for example. At block 420, the authorization code of the selected authorization may be transmitted to a seller terminal 170. For example, and not by way of limitation, a screen of the mobile device 105 may display a QR code or other barcode corresponding to the authorization code, and the seller terminal 170 may scan the QR code or other barcode. For another example, Bluetooth or NFC technology may be used to automatically transmit the authorization code to the seller terminal 170.

At block 425, the seller terminal 170 may communicate the authorization code to the payment server 180 along with sale data that describes the current circumstances of the sale to be made. For example, the sale data may include enough information about the sale for the payment server 180 to determine whether the payment criteria associated with the authorization are met.

At decision block 430, the payment server 180 may decide whether to approve the payment to the seller. To this end, the payment server 180 may determine whether the sale data meets the payment criteria. In some cases, before approving the payment, the payment server 180 may request that further authentication of the user be received through the seller terminal 170. If the payment criteria are sufficiently met and if any requested authentication is satisfied, then the payment server 180 may approve the payment. Otherwise, the payment server 180 may deny the payment.

If the payment is rejected, then at block 435, a notice of the rejection may be transmitted to the seller terminal 170, and the payment will be declined at the seller terminal 170. However, if the payment is approved, then the payment server 180 may reduce funds availability of the user at block 440. At block 445, the payment server 180 may send a notification of approval to the seller terminal 170, which may receive the approval. The seller terminal 170 may then finalize the sale.

Figure 5:
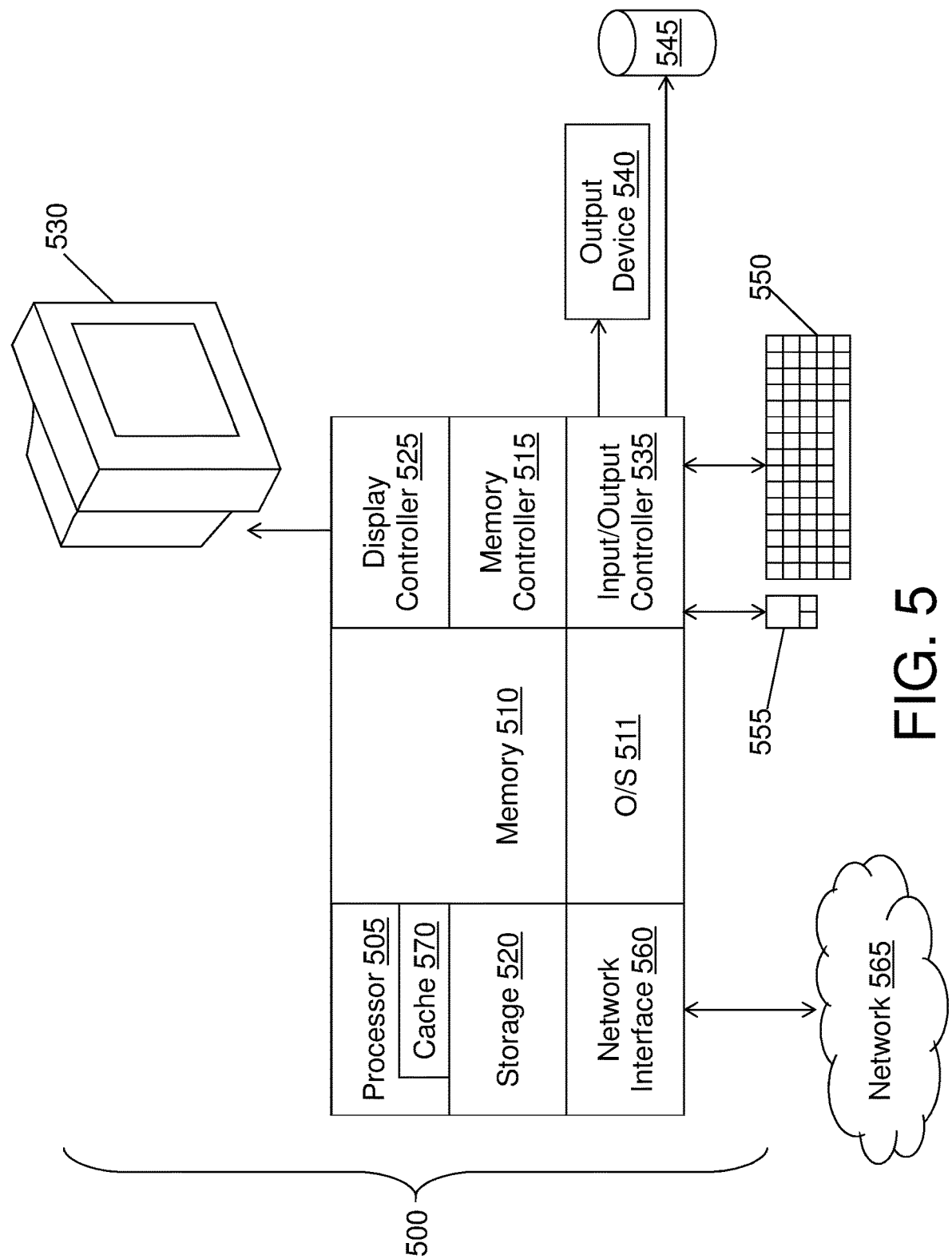
FIG. 5 is a block diagram of a computer system for implementing some or all aspects of the payment system, according to some embodiments of this invention.

FIG. 5 is a block diagram of a computer system 500 for implementing some or all aspects of the payment system 100, according to some embodiments of this invention. The payment systems 100 and methods described herein may be implemented in hardware, software (e.g., firmware), or a combination thereof. In some embodiments, the methods described may be implemented, at least in part, in hardware and may be part of the microprocessor of a special or general-purpose computer system 500, such as a personal computer, workstation, minicomputer, or mainframe computer. For instance, the mobile device 105 utilizing the payment system 100 may be a computer system 500 as shown in FIG. 5. Further, each payment server 180 or seller terminal 170 may be or include a computer system 500 or a portion of a computer system 500.

In some embodiments, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor-based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid-state drive. The stored instructions in memory 510 or in storage 520 may include those enabling the processor to execute one or more aspects of the payment systems 100 and methods of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Payment systems 100 and methods according to this disclosure may be embodied, in whole or in part, in computer program products or in computer systems 500, such as that illustrated in FIG. 5.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   predicting that a mobile device will enter a reduced-functionally state, wherein the reduced-functionally state is a low-power state;
   predicting an expected payment to be made with the mobile device during the reduced-functionally state;
   generating a preauthorization request automatically based on the expected payment, wherein the preauthorization request is associated with a first user;
   submitting, prior to the mobile device entering the reduced-functionally state, the preauthorization request for a payment to a payment provider;
   receiving from the payment provider an authorization code associated with a set of final payment criteria, wherein the final payment criteria comprise at least one of a location restriction, a timeframe restriction, a category restriction, and a seller restriction;
   transferring, by the mobile device, the authorization code to a second mobile device associated with a second user and notifying the payment provider of the transfer; and
   presenting the authorization code, via near field communications (NFC) by the second mobile device, to a seller terminal as a payment for a sale, wherein the payment is approved based on confirmation that sale data describing the sale complies with the final payment criteria.

2. The computer-implemented method of claim 1, wherein the generating the preauthorization request comprises:
   predicting at least one of an expected location, an expected timeframe, and expected seller information associated with the expected payment; and
   generating requested payment criteria for inclusion in the preauthorization request.

3. The computer-implemented method of claim 1, wherein the seller terminal transmits the authorization code and the sale data to the payment provider, and wherein the payment provider confirms that the sale data complies with the final payment criteria.

4. The computer-implemented method of claim 3, wherein the seller terminal receives authentication data from a user associated with the authorization code, and wherein the payment provider authenticates the user with the authentication data.

5. A system comprising:
   a memory having computer-readable instructions; and
   one or more processors for executing the computer-readable instructions, the computer-readable instructions comprising:
      predicting that a mobile device will enter a reduced-functionally state, wherein the reduced-functionally state is a low-power state;
      predicting an expected payment to be made with the mobile device during the reduced-functionally state;
      generating a preauthorization request automatically based on the expected payment, wherein the preauthorization request is associated with a first user;
      submitting, prior to the mobile device entering the reduced-functionally state, the preauthorization request for a payment to a payment provider;
      receiving from the payment provider an authorization code associated with a set of final payment criteria, wherein the final payment criteria comprise at least one of a location restriction, a timeframe restriction, a category restriction, and a seller restriction;
      transferring, by the mobile device, the authorization code to a second mobile device associated with a second user and notifying the payment provider of the transfer; and
      presenting the authorization code, via near field communications (NFC) by the second mobile device, to a seller terminal as a payment for a sale, wherein the payment is approved based on confirmation that sale data describing the sale complies with the final payment criteria.

6. The system of claim 5, wherein the generating the preauthorization request comprises:
   predicting at least one of an expected location, an expected timeframe, and expected seller information associated with the expected payment; and
   generating requested payment criteria for inclusion in the preauthorization request.

7. The system of claim 5, wherein the seller terminal transmits the authorization code and the sale data to the payment provider, and wherein the payment provider confirms that the sale data complies with the final payment criteria.

8. The system of claim 7, wherein the seller terminal receives authentication data from a user associated with the authorization code, and wherein the payment provider authenticates the user with the authentication data.

9. A computer-program product for making payments, the computer-program product comprising a computer-readable storage medium having program instructions embodied therewith, the program instructions executable by a processor to cause the processor to perform a method comprising:
   predicting that a mobile device will enter a reduced-functionally state;
   predicting an expected payment to be made with the mobile device during the reduced-functionally state, wherein the reduced-functionally state is a low-power state;

generating a preauthorization request automatically based on the expected payment, wherein the preauthorization request is associated with a first user;

submitting, prior to the mobile device entering the reduced-functionally state, the preauthorization request for a payment to a payment provider;

receiving from the payment provider an authorization code associated with a set of final payment criteria, wherein the final payment criteria comprise at least one of a location restriction, a timeframe restriction, a category restriction, and a seller restriction;

transferring, by the mobile device, the authorization code to a second mobile device associated with a second user and notifying the payment provider of the transfer; and presenting the authorization code, via near field communications (NFC) by the second mobile device, to a seller terminal as a payment for a sale, wherein the payment is approved based on confirmation that sale data describing the sale complies with the final payment criteria.

10. The computer-program product of claim 9, wherein the generating the preauthorization request comprises:

predicting at least one of an expected location, an expected timeframe, and expected seller information associated with the expected payment; and generating requested payment criteria for inclusion in the preauthorization request.

11. The computer-program product of claim 9, wherein the seller terminal transmits the authorization code and the sale data to the payment provider, and wherein the payment provider confirms that the sale data complies with the final payment criteria.

12. The computer-program product of claim 11, wherein the seller terminal receives authentication data from a user associated with the authorization code, and wherein the payment provider authenticates the user with the authentication data.

* * * * *